US00RE44281E

(19) United States
(12) Reissued Patent
Snyder

(10) Patent Number: US RE44,281 E
(45) Date of Reissued Patent: Jun. 11, 2013

(54) LED FLASHLIGHT AND HEAT SINK ARRANGEMENT

(75) Inventor: Mark W. Snyder, Hockessin, DE (US)

(73) Assignee: Streamlight, Inc., Eagleville, PA (US)

(21) Appl. No.: 13/280,984

(22) Filed: Oct. 25, 2011

Related U.S. Patent Documents

Reissue of:
(64) Patent No.: 7,883,243
Issued: Feb. 8, 2011
Appl. No.: 11/779,038
Filed: Jul. 17, 2007

U.S. Applications:
(60) Provisional application No. 60/832,106, filed on Jul. 20, 2006.

(51) Int. Cl.
*F21V 29/00* (2006.01)
*F21L 4/00* (2006.01)

(52) U.S. Cl.
USPC ..... 362/294; 362/196; 362/200; 362/373

(58) Field of Classification Search
USPC ..... 362/196, 200, 294, 373, 545, 547, 362/202–208, 646, 631, 249.02, 218, 345
See application file for complete search history.

(56) References Cited

U.S. PATENT DOCUMENTS

| | | | | |
|---|---|---|---|---|
| 4,313,272 | A | 2/1982 | Matthews | |
| 4,531,178 | A | 7/1985 | Uke | |
| 4,683,523 | A | 7/1987 | Olsson et al. | |
| 4,729,076 | A | 3/1988 | Masami et al. | |
| 4,885,668 | A | 12/1989 | Maglica et al. | |
| 5,309,337 | A | 5/1994 | Groben | |
| 5,404,281 | A | 4/1995 | Parker | |
| 5,432,689 | A | 7/1995 | Sharrah et al. | |
| 5,463,541 | A | 10/1995 | Greene | |
| 5,486,432 | A | 1/1996 | Sharrah et al. | |
| 5,567,036 | A | 10/1996 | Theobald et al. | |
| 5,678,921 | A | 10/1997 | Kish et al. | |
| 5,785,418 | A | 7/1998 | Hochstein | |
| 5,806,965 | A | 9/1998 | Deese | |
| 5,821,695 | A | 10/1998 | Vilanilam et al. | |
| 5,871,272 | A | 2/1999 | Sharrah et al. | |
| 6,318,886 | B1 * | 11/2001 | Stopa et al. | 362/555 |
| 6,558,020 | B1 * | 5/2003 | Holzer | 362/221 |

(Continued)

OTHER PUBLICATIONS

Streamlight, Inc., "Introducing the New Survivor from Streamlight", http://www.streamlight.com/survivor_info.htm, printed Jun. 22, 2006, 1 page.

(Continued)

*Primary Examiner* — Thomas Sember
(74) *Attorney, Agent, or Firm* — Clement A. Berard, Esq.; Dann, Dorfman, Herrell & Skillman, PC

(57) ABSTRACT

An LED light may comprise a light emitting diode selectively energizable for producing light; an electronic circuit for selectively energizing the light emitting diode; and a heat sink of a thermally conductive material, wherein the light emitting diode is thermally bonded to the heat sink; and wherein the electronic circuit is attached to the heat sink. The light may have a pair of contact springs extending from the heat sink and the electronic circuit may include thermal conductivity enhancing features.

84 Claims, 5 Drawing Sheets

U.S. PATENT DOCUMENTS

| | | | | |
|---|---|---|---|---|
| 6,585,391 | B1 | 7/2003 | Koch et al. | |
| 6,633,152 | B2 | 10/2003 | Sharrah et al. | |
| 6,819,505 | B1 | 11/2004 | Cassarly et al. | |
| 6,827,468 | B2 | 12/2004 | Galli | |
| 6,853,151 | B2 * | 2/2005 | Leong et al. | 315/185 R |
| 6,942,365 | B2 | 9/2005 | Galli | |
| 6,964,507 | B2 * | 11/2005 | Mohacsi | 362/545 |
| 6,966,677 | B2 | 11/2005 | Galli | |
| 6,974,234 | B2 | 12/2005 | Galli | |
| 7,008,084 | B2 | 3/2006 | Galli | |
| 7,014,335 | B2 | 3/2006 | Probst et al. | |
| 7,055,989 | B2 | 6/2006 | Galli | |
| 7,083,305 | B2 | 8/2006 | Galli | |
| 7,220,013 | B2 | 5/2007 | Sharrah et al. | |
| 7,296,913 | B2 * | 11/2007 | Catalano et al. | 362/257 |
| 7,344,279 | B2 * | 3/2008 | Mueller et al. | 362/294 |
| 7,651,240 | B2 | 1/2010 | Bayat et al. | |
| 7,738,229 | B2 | 6/2010 | Bayat et al. | |
| 7,745,957 | B2 | 6/2010 | Bayat et al. | |
| 2004/0054386 | A1 | 3/2004 | Martin et al. | |
| 2005/0017366 | A1 | 1/2005 | Galli | |
| 2005/0024864 | A1 | 2/2005 | Galli | |
| 2005/0057187 | A1 | 3/2005 | Catalano | |
| 2005/0083686 | A1 | 4/2005 | Yatsuda et al. | |
| 2005/0122713 | A1 | 6/2005 | Hutchins | |
| 2005/0128741 | A1 | 6/2005 | Matthews et al. | |
| 2005/0161684 | A1 | 7/2005 | Galli | |
| 2005/0161692 | A1 | 7/2005 | Galli | |
| 2005/0168985 | A1 | 8/2005 | Chen | |
| 2005/0201100 | A1 | 9/2005 | Cassarly et al. | |
| 2005/0243558 | A1 | 11/2005 | Van Duyn | |
| 2006/0013000 | A1 | 1/2006 | Coushaine et al. | |
| 2006/0039139 | A1 | 2/2006 | Maglica et al. | |
| 2006/0067077 | A1 | 3/2006 | Kumthampinij et al. | |
| 2006/0109655 | A1 | 5/2006 | Martin | |
| 2006/0109661 | A1 | 5/2006 | Coushaine et al. | |
| 2006/0145180 | A1 | 7/2006 | Galli | |
| 2007/0253194 | A1 | 11/2007 | Sharrah et al. | |
| 2010/0148697 | A1 | 6/2010 | Bayat et al. | |

OTHER PUBLICATIONS

Streamlight, Inc., "Syclone Assembly C130000A", 1999, 1 page.
Streamlight, Inc., "Survivor Specifications", http://www.streamlight.com/survivor_specifications.htm printed Jun. 22, 2006, 2 pages.
Streamlight, Inc., "Survivor Parts & Accessories", http://www.streamlight.com/survivorlight.com/survivor_accessories_2001.htm printed Jun. 22, 2006, 1 page.

* cited by examiner

LED FLASHLIGHT AND HEAT SINK ARRANGEMENT

Matter enclosed in heavy brackets [ ] appears in the original patent but forms no part of this reissue specification; matter printed in italics indicates the additions made by reissue.

This Application claims the benefit of U.S. Provisional Patent Application No. 60/832,106 filed Jul. 20, 2006, each of which is hereby incorporated herein by reference in its entirety.

The present invention relates to a light and, in particular, to a light having a light emitting diode and a heat sink.

Increasingly, flashlights and other portable lights are employing a solid state light source, such as a light-emitting diode (LED), particularly as the brightness of the available LEDs has improved and as LEDs have become available that produce bright "white" light.

Unlike incandescent lamps which depend upon the heating of a light producing filament to a high temperature to produce light, LEDs are desirably operated at lower temperatures at which their efficiency and reliability is better. Thus, whereas it was relatively unimportant in many instances to remove the heat generated by an incandescent lamp, it may be quite important that heat generated by a high-power LED be removed.

While incandescent lamps may be satisfactorily operated by applying a voltage, e.g., a battery voltage, directly to the lamp, such is not a desirable way in which to operate a solid state light source such as an LED. Thus, along with the use of LEDs as light sources in portable lights has come the utilization of electronic circuits for conditioning the electrical power provided by an electrical power source into a form more suitable for the LED, for example, for controlling the level of current flowing through the LED.

As such power regulating circuit technology has been developed, power regulating circuits have also come to be employed with incandescent light sources as well as with solid state light sources. As a result, portable lights have come to include electronic circuitry as well as the usual battery (or batteries) and light sources.

Because heat can be detrimental to electronic circuitry, there is a need to remove heat from such circuitry. In addition, certain failure and/or fault conditions may cause additional heat to be produced that could raise the temperature of electronic circuitry to a temperature that is not only detrimental to the circuitry, but that could also be a hazard or a danger to the circuitry or otherwise.

Accordingly, there is a need for light including a heat sink arrangement for removing heat from a light source and/or electronic circuitry of the light.

To this end, a light may comprise a light emitting diode selectively energizable for producing light; an electronic circuit for selectively energizing the light emitting diode; and a heat sink of a thermally conductive material, wherein the light emitting diode is thermally bonded to the heat sink; and wherein the electronic circuit is attached to the heat sink.

According to another aspect, a light may comprise a heat sink including a first generally rectangular planar member, two opposing elongated members each integrally joined to the first rectangular planar member, and a second generally rectangular member integrally joined to the two elongated members and to the first generally rectangular member. A light emitting diode may be attached to the first generally rectangular planar member between the two elongated members and circuitry for energizing the light emitting diode may be attached to the second generally rectangular planar member between the two opposing elongated members.

BRIEF DESCRIPTION OF THE DRAWING

The detailed description of the preferred embodiment(s) will be more easily and better understood when read in conjunction with the FIGURES of the Drawing which include.

Figure 1:
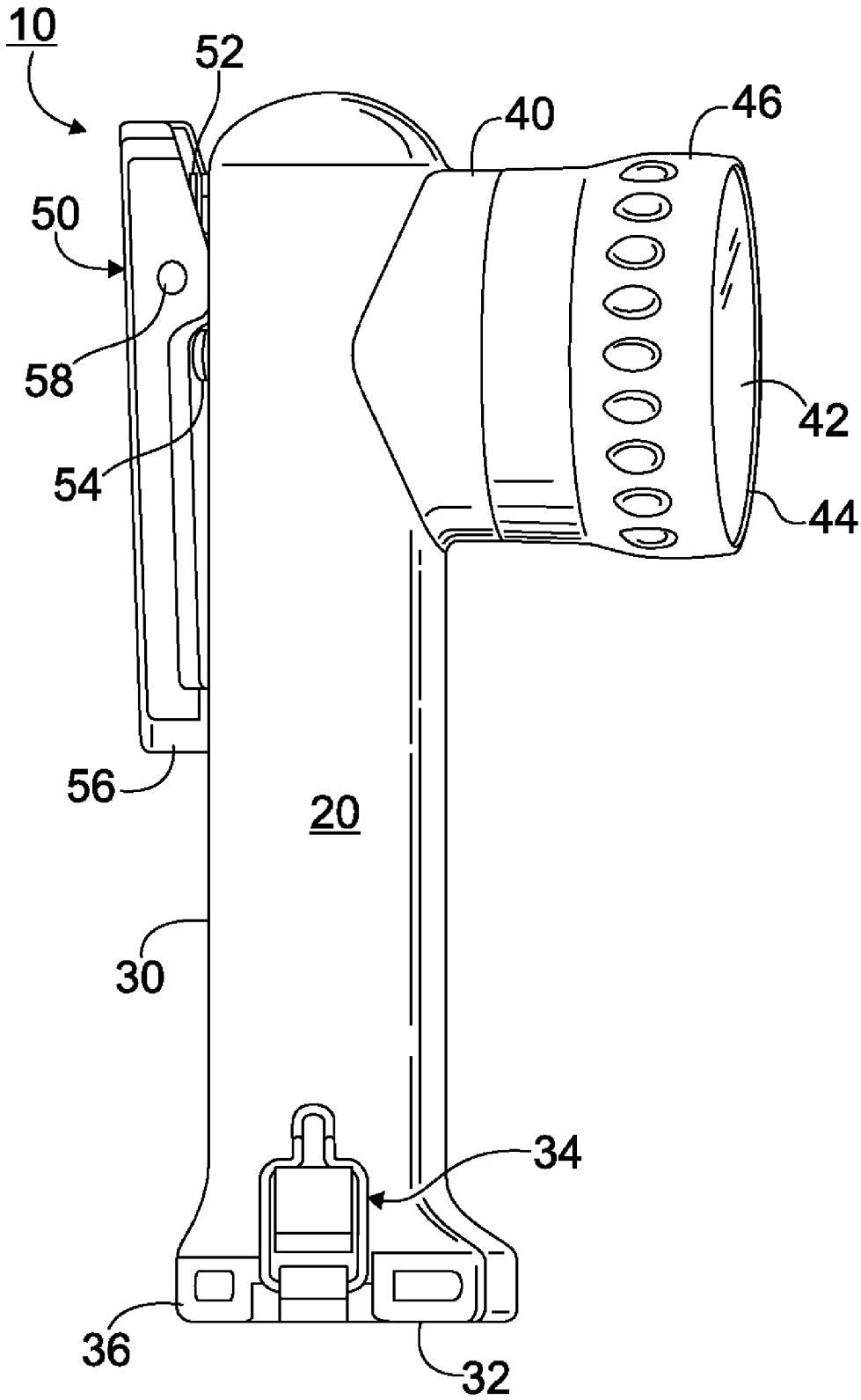
FIG. 1 is a view of an example embodiment of a light including the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

FIG. 1 is a view of an example embodiment of a light 10 including the present arrangement. Light 10 includes a housing 20 including a portion 30 in which a battery or batteries may be provided and a portion 40 in which are a reflector 42 and light 10' and a source of electrical power such as a battery 40. Housing portion 40 may be angled with respect to housing portion 30, e.g., approximately perpendicularly as illustrated, or at another angle, or housing portions 30, 40 may be axially aligned, as may be desired. In the illustrated arrangement, light 10 may desirably be placed with base 32 on a generally horizontal surface or into a charger unit and remain standing thereon with light produced by light 10' emanating outwardly in a generally horizontal direction.

A light 10' (not visible, described below) may be disposed at the base of reflector 42 internal to housing 20 substantially at the intersection of the rear of light housing 40 and the upper end of battery housing 30, thereby to project a beam of light from reflector 40 through lens 44. Within housing 20 of light 10 is a heat sink 100 (not visible, described below) which generally conforms to the geometry and shape of housing 20 and which dissipates heat generated by light 10' therein and which supports the light source and electronic control circuitry therefor.

Battery housing portion 30 may include at its base 32 an access cover 36 that has hinges and/or clasps 34 for attaching cover 36 to battery housing portion 30 and through which the battery or battery may be inserted and removed, and may optionally include contacts for making electrical connection with a charger unit into which light 10 may be placed for charging the battery in housing portion 30.

Light source housing portion 40 may include a ring member that removably attaches to housing portion 40, e.g., in a threaded engagement therewith, for retaining reflector 42 and lens 44 in housing portion 40. Ring member 46 could be rotatable for manipulating a mechanism for adjusting the shape and/or focus of the beam of light produced by light 10 and projected outwardly through lens 34.

Housing 20 may also include a clip 50, e.g., secured at the rear of housing 20 by screws 54 engaging housing 20 and heat sink 100 therein, as described below. Optionally, clip 50 may be pivoted, e.g., on pivot pin 58, and end 56 of clip 50 may be biased against housing 20 by a spring 52 and so the end 56 of clip 50 may be moved toward and away from housing 20, thereby to facilitate clipping light 10 to a pocket, belt or other item, as may be convenient and/or desirable. Clip 50 may have an optional projection extending from end 56 towards housing 20 (as illustrated) or not.

Typically, battery housing portion 30 may have a race-track or oval shaped cross-section, e.g. for receiving four size AA battery cells in a side-by-side arrangement, and light source housing portion 40 may be circular in cross-section. The four AA size battery cells may be alkaline cells, rechargeable NiCd cells, or another suitable battery cell(s), and may be utilized as cells or may be disposed in a common package to be a battery pack.

Although terms such as front, back, top, bottom, and side may be employed in describing the example embodiment as illustrated by the FIGURES, the present arrangement may be utilized in any orientation, and so what is termed top or bottom herein may or may not be the top or bottom in utilization, what is termed front or back may or may not be the front or back in utilization, and so forth.

Figure 2:
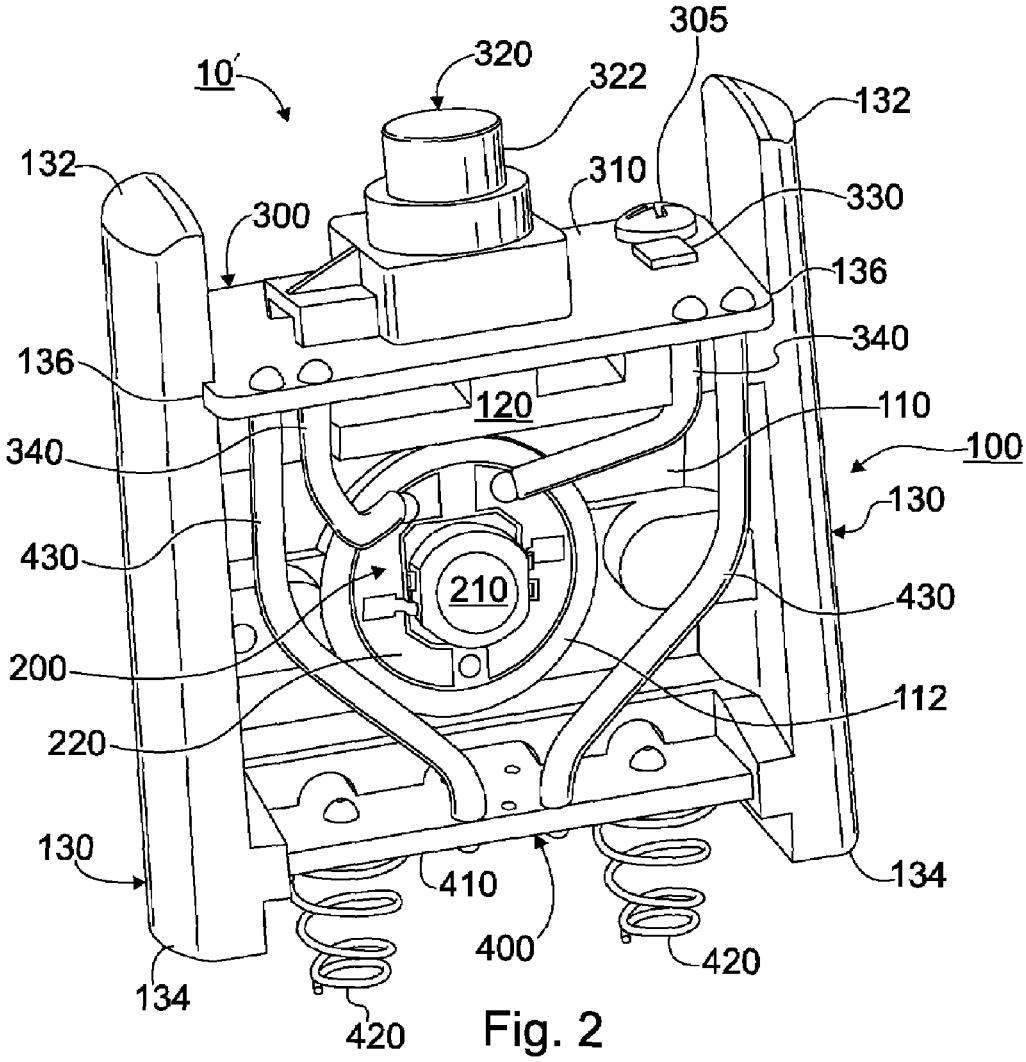
FIG. 2 is an isometric view of a first side of an example embodiment of a light according to the present arrangement.
Figure 3:
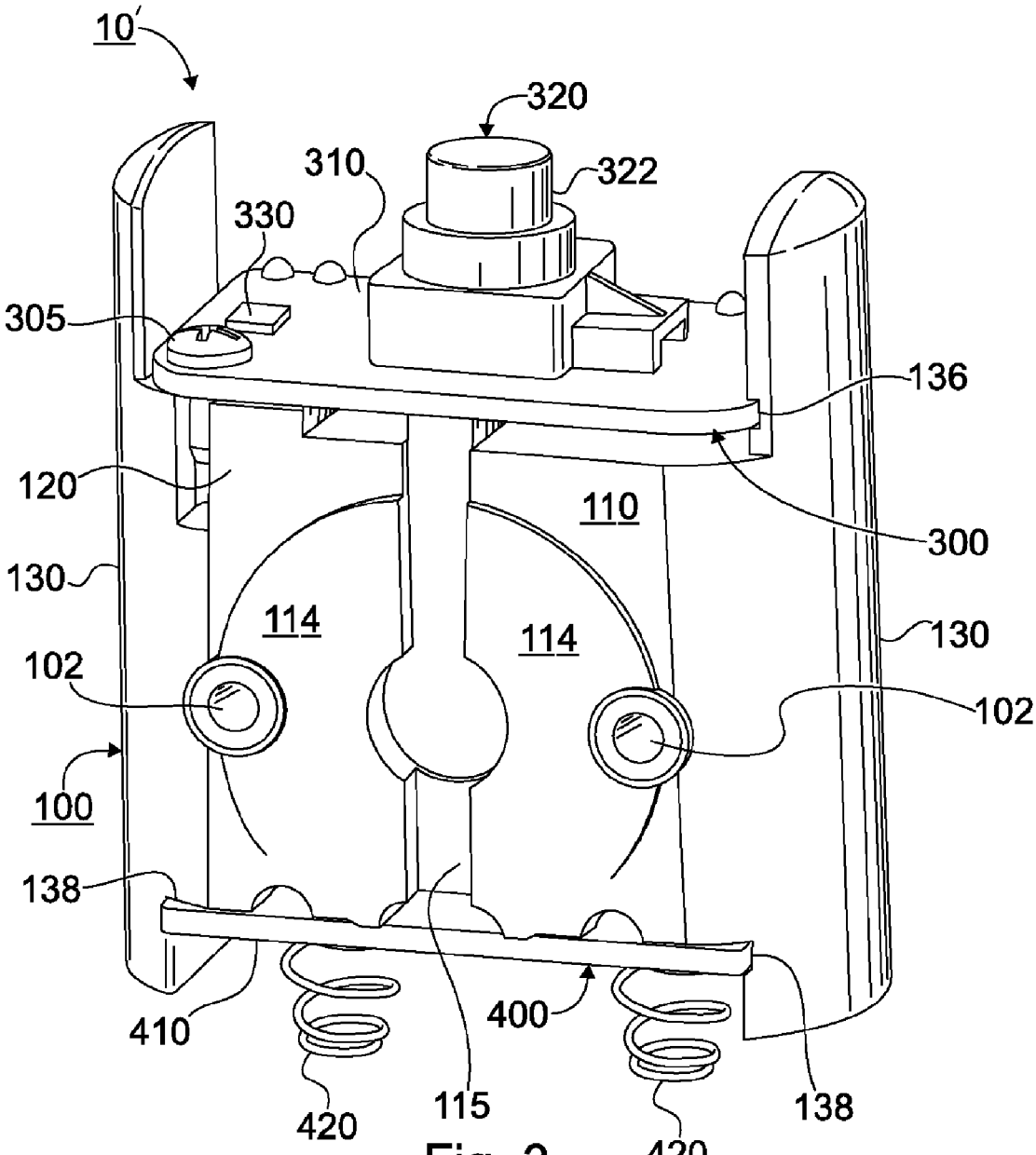
FIG. 3 is an isometric view of a second side of the example embodiment of a light according to FIGS. 1 and 2.

FIG. 2 is an isometric view of a first side (or front side) of an example embodiment of a light 10' and FIG. 3 is an isometric view of a second side (or rear side) of the example embodiment of light 10' according to the present arrangement. Light 10' may comprise a heat sink 100, a light emitting diode (LED) assembly 200 attached thereto, and electronic circuit boards 300, 400 attached thereto. A source of electrical power, such as a battery, may be connected to circuit board 400 and light 10' may be, and typically is, disposed in a case or housing.

When light 10, 10' is operated under normal operating conditions, certain electronic components thereof, e.g., the light source (e.g., LED assembly 200) and a control device for the light source (e.g., component 330 on circuit board 300), typically generate heat that must be dissipated to prevent the temperature of such components from increasing excessively, e.g., to where such component could be damaged or fail, or to where a dangerously high temperature occurs. In normal operation, the light source is typically the predominant generator of heat.

In addition, under fault conditions such as the failure of an electronic component or a short circuit, the light source (e.g., LED assembly 200) and components controlling the light source (e.g., component 330 on circuit board 300) may generate more heat than under normal conditions. Under fault conditions, the control device often typically generates substantially greater heat than other components and than it does under normal operation.

Thus heat sink 100 serves the dual functions of dissipating heat from the light source 200 under normal operation and of dissipating heat from other components under fault conditions. Desirably, heat sink 100 dissipates sufficient heat under both normal and fault conditions such that no component will reach or exceed a temperature which is considered by Underwriters' Laboratory (UL) to be dangerously hot, thereby to be eligible for UL approval of light 10, 10' as a Class I, Division I, device. For UL approval for use in an environment subject to T4 gases, the maximum allowable component temperature for UL approval is 200° C. when the light is in a 40° C. ambient temperature environment. In addition, heat sink 100 also serves the functions of supporting LED 210, of positioning LED 210 to be aligned with reflector 30 of light 10, and of supporting electronic circuit board 300 that controls the operation of LED 210.

Heat sink 100 includes a first generally rectangular member 110 that is generally planar and that has front and back broad surfaces. Heat sink 100 may include two elongated members 130 that are [integrallyjoined] *integrally joined* to opposing edges, e.g., side edges, of first generally rectangular member 110, and each opposing elongated member 130 typically has opposing ends 132, 134 that extend beyond the top and bottom edges of first generally rectangular member 110.

A second generally rectangular member 120 is integrally joined to one edge, e.g., the top edge, of first generally rectangular member 110, and between the two elongated members 130 to which its opposing ends are [integrallyjoined] *integrally joined*. Typically, because ends 132, 134 of elongated members 130 in the example embodiment extend beyond the top and bottom edges of first generally rectangular member 110 and beyond second generally rectangular member 120, and so heat sink 100 may be described as having an "H"-like shape.

LED assembly 200 is attached to one of the broad surfaces, e.g., the front surface, of first generally rectangular member 110, and is typically bonded to a central region of the front surface thereof by a suitable thermally conductive adhesive. As a result LED 210 of LED assembly is thermally coupled to heat sink 100 for facilitating the removal of heat produced by LED 210 when it is energized to produce light. LED assembly 200 includes light emitting diode (LED) 210 that may attached for convenience in assembly to an electronic circuit board (described below) for making electrical connections between LED 210 and electronic circuit board 300, such as by conductors 340, e.g., insulated wires 340. Conductors 340 may be electrically connected to circuit board 300 by soldering, by electrically conductive adhesive, by mechanical crimping or swaging, or by another suitable connection.

Electronic circuit board 300 typically carries electronic circuitry for controlling the energization of LED 210, and may comprise an electronic circuit board substrate 310 on which are provided various conductors and electronic components in conventional fashion, e.g., on either or both of the broad surfaces thereof. Examples of such electronic components carried on substrate 310 may include, e.g., an electrical switch 320 directly or indirectly energizing and de-energizing LED 210, an electronic control device 330 for applying, removing and/or regulating or otherwise controlling electrical power applied to LED 210, and optionally various integrated circuits, transistors, diodes, resistors, capacitors, and the like.

Electronic circuit board 300 may be attached to heat sink 100 in various ways, however, a preferred attachment includes circuit board 300 being adjacent to second generally rectangular member 120, e.g., for facilitating removal of heat from the electronic components thereon. While such heat may be produced in normal operation of light 10', additional heat may be produced under a fault condition, e.g., damage to or failure of an electronic component on circuit board 300 or of LED 210 or of an electrical short circuit.

In one such mounting arrangement for circuit board 300, a groove 136 is provided in one elongated member 130 adjacent second generally rectangular member 120 for supporting a first end of circuit board 300 and a fastener 305, such as a screw or bolt, supports another end of circuit board 300. In particular, it is preferred that electronic components, such as a control device 330, that may generate substantial heat under normal operation and/or under a fault condition be disposed on circuit board substrate 310 in a location that is proximate to fastener 305, thereby to be thermally coupled to second generally rectangular member 120 by a relatively short thermal conduction path.

Control device 330 may be, e.g., a transistor that controls application of electrical power to LED 210, such as a MOSFET transistor, that operates as a power switching device, as a power controlling device, as a power regulating device, or for otherwise controlling electrical voltage or current. Circuit substrate 310 may include substantial electrical conductor area, a thicker electrical conductor, conductive vias, or another arrangement, proximate to the location thereon where fastener 305 attaches circuit board 300 to heat sink 100 for reducing the thermal resistance between one or more heat generating components, e.g., control device 330, and heat sink 100. While a thermally conductive grease or adhesive may be employed between circuit board 300 to heat sink 100, it has been found that fastener 305 alone typically is sufficient and that such thermal grease or adhesive is not needed in the example arrangement.

Heat sink 100 in the example embodiment preferably is sufficient to dissipate and/or distribute heat generated by light 10' under normal operation and fault conditions without having an exposed surface or being attached to a highly thermally conductive case or housing. Examples of fault conditions might include a short circuit of LED 210 or a short circuit directly applying full battery voltage to LED 210. Under normal operation and fault conditions, heat sink 100 maintains LED 200, 210 and all electronic components including certain power handling components on circuit board 300 to a safe temperature, e.g., to a temperature less than 200° C., whereby light 10, 10' is eligible for Underwriters' Laboratory (UL) certification as a Division I, Class I, device and/or in a T4 gas environment.

Electronic circuit board 400 includes circuit board substrate 410 that carries electrical conductors and various electronic and other components in conventional fashion. Electrical contacts 420, which may be coiled spring-like structures of electrically conductive wire, extend from circuit board substrate 310 in a direction away from heat sink 100 for making electrical contact with the terminals of a battery or other source of electrical power for light 10' and that may be carried either externally to light 10' or in a case or housing thereof. Electrical power from such power source may be carried by conductors 430, e.g., insulated wires 430, connecting between electronic circuit board 400 and electronic circuit board 300. Conductors 430 may be electrically connected to circuit boards 300 and 400 by soldering, by electrically conductive adhesive, by mechanical crimping or swaging, or by another suitable connection.

Electronic circuit board 400 is preferably attached to heat sink 100. For example, heat sink 100 may have a pair of opposing grooves or slots 130 in opposing elongated members 130 into which circuit board 400 is inserted. Because circuit board 400 in the example embodiment does not carry electronic components that would produce significant heat under either normal operation or fault conditions, it is not necessary to provide good thermal coupling between circuit board 400 and heat sink 100. Should such components be carried by circuit board 400, then circuit board 400 could be attached to heat sink 100 is similar manner to that employed for circuit board 300.

Heat sink 100 may have one or more features for increasing its thermal conduction capability. For example, a raised circular area 112 on the front surface of first generally rectangular member 110 may be provided to increase the thickness of member 110 proximate to where LED assembly 200 is attached thereto, thereby to reduce the thermal resistance and increase the thermal mass of member 110. In addition, raised ridges may be provided extending from the raised circular area to further reduce thermal resistance and increase thermal mass. Two raised substantially semi-circular features 114 on the rear surface of heat sink 100 have a similar benefit.

Substantially semi-circular features 114 also provide surfaces that can contact the interior surface of housing 20 when screws 54 are tightened, and define a groove or slot 115 which allows any gas that might be generated by the battery or batteries in housing portion 30 to flow upward to a venting valve (not visible) typically located near or at the top of light 10 proximate light portion 40.

Heat sink 100 is typically and preferably disposed in a case or housing in use, and may be provided with a means for attaching heat sink 100 to such case or housing. For example, one or more holes 102 may be provided on the rear surface of heat sink 100 to receive fasteners inserted through corresponding holes in the case or housing. Holes 102 may be tapped or have threaded inserts to receive screws or bolts, or may receive self-tapping or other fasteners. The fasteners that engage holes 102 may also be utilized to attach a part or parts to the outside of the case or housing, e.g., to attach a pocket clip, a belt clip, a spring-loaded clip, a lanyard ring, and/or other part.

Heat dissipation by heat sink 100 includes conducting heat from the relatively small areas whereat heat is generated, e.g., at LED 210 and/or at control device 330 on circuit board 300, to the various members of heat sink 100, thereby to reduce temperature by spreading the heat over a substantially larger area and/or by allowing heat to be dissipated over that substantially larger area.

For example, heat generated by LED 210 on first generally rectangular member 110 is conducted due to the relatively high thermal conductivity of heat sink 100 from first generally rectangular member 110 to second generally rectangular member 120 and to both elongated members 130 which would tend to be cooler because there is no heat generating element thereon. Similarly, heat generated by control device 330 on electronic circuit board 300 is conducted through circuit board substrate 310 and fastener 305 to second generally rectangular member 120 is conducted due to the relatively high thermal conductivity of heat sink 100 from second generally rectangular member 120 to first generally rectangular member 110 and to both elongated members 130 which would tend to be cooler because there is no heat generating element thereon.

If and when both LED 210 and control device 330 were to be generating substantial heat at the same time, the heat therefrom is conducted to first and second generally rectangular members 110, 120 and from first and second generally rectangular members 110, 120 to both elongated members 130 which would tend to be cooler because there is no heat generating element thereon.

In addition to heat conduction through heat sink 100 due to the relatively high thermal conductivity thereof, heat is also removed to a lesser extent by convection and by radiation, e.g., from the elements that are generating substantial heat as well as from the surface of heat sink 100. Further, removal of heat from heat sink 100 is thought to be aided by the exterior of heat sink 100, e.g., by the curved outer surfaces of elongated members 130, being shaped to generally conform geometrically to the interior surface of housing 20 in which heat sink 100 is disposed.

Because heat sink 100, e.g., as in the example embodiment, preferably is sufficient to dissipate and/or distribute heat generated by light 10' under normal operation and fault conditions without having an exposed surface or being attached to a highly thermally conductive case or housing. Thus, the case or housing of light 10, 10' need not be made of a thermally conductive material Typically, certain external surfaces of heat sink 100 may be shaped to conform to the inside configuration of a case or housing, e.g., in the example embodiment, elongated members 130 are extended and have curved outer surfaces to conform to the height and shape of a housing that has a flat rear surface and curved side surfaces. Such housing may have a flat top surface through which actuator 322 of switch 320 may be actuated, either directly or through a flexible boot or button.

Figure 4:
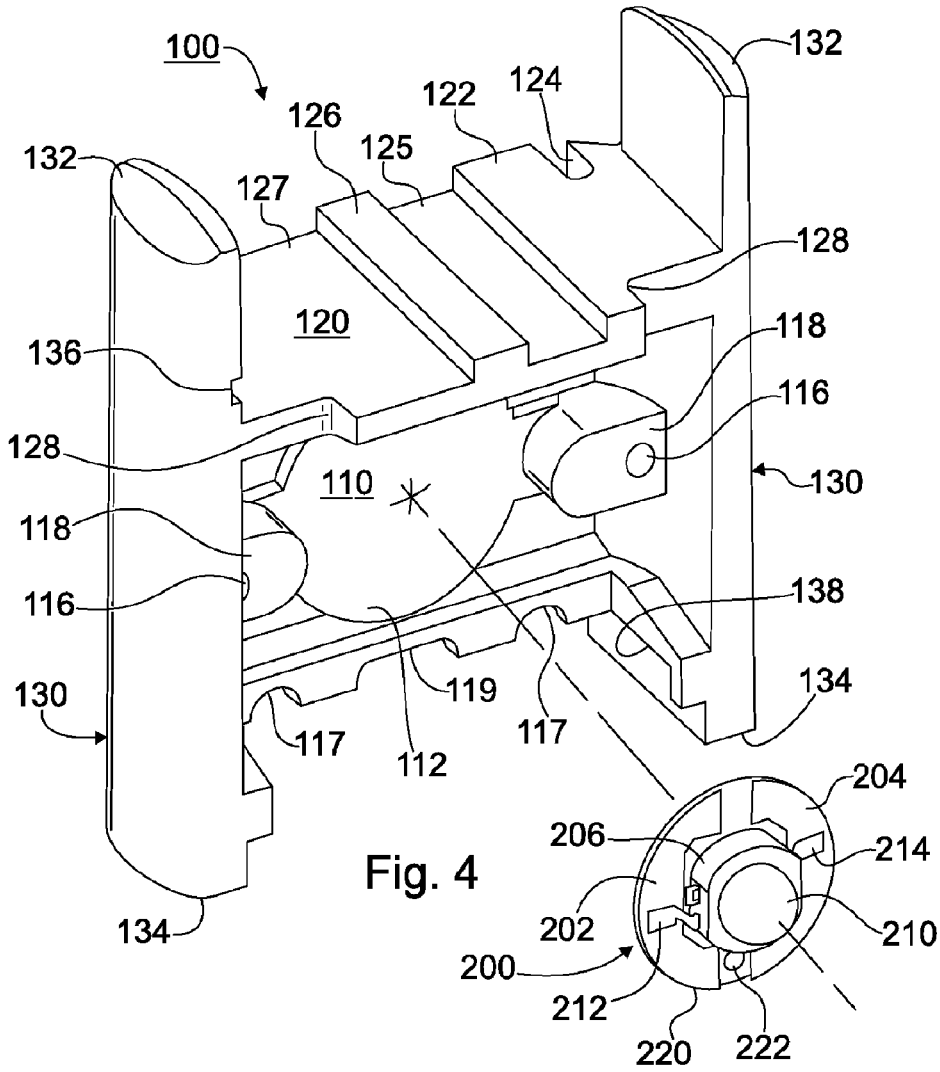
FIG. 4 is an exploded isometric view of the heat sink and LED assembly of the example embodiment of a light according to FIGS. 1-3.

FIG. 4 is an exploded isometric view of heat sink 100 and LED assembly 200 of the example embodiment of a light 10' according to FIGS. 1-3. Heat sink 100 and LED assembly 200 are described above and so that description will not be repeated here except in relation to certain features more evident in FIG. 4.

First generally rectangular member 110 is seen to have a raised circular feature 112 on the front face thereof which provides a convenient flat surface on which to attach LED assembly 200. Because raised circular feature 112 increases the thickness of generally rectangular member 110, it also reduces the thermal resistance and increases the thermal mass of heat sink 100. A bevel may be provided along the edge where first and second generally rectangular members 110, 120 join, which increases the thermal mass and reduces thermal resistance therebetween.

Second generally rectangular member 120 is seen to have a generally planar raised area 122 against which one end of circuit board 300 may bear, preferably the end of circuit board 300 that carries electronic components that generate heat under normal operation and/or under fault conditions. Slot or hole 124 therein is for receiving fastener 305 which attaches circuit board 300 to second generally rectangular member 120. Raised ridge 126 may be flat at its top and may provide support for circuit board 300 in a region thereof under electrical switch 320 so that circuit board 300 can withstand any stress caused by a user pressing on actuator 322 of switch 320. Area 122 and ridge 126 define a recess 125 therebetween and ridge 126 and elongated member 130 define a recess therebetween that may provide clearance between second generally rectangular member 120 and circuit board 300 for leads of electronic components and solder areas of circuit board 300. Because raised area 122 and raised ridge 126 increase the thickness of second generally rectangular member 120, they also reduce the thermal resistance and increase the thermal mass of heat sink 100.

LED assembly 200 comprises LED 210 and electronic circuit board 220. LED 210 is preferably an LED that produces substantial light so as to be useable for general illumination, e.g., as a flashlight. LED 210 is preferably a white emitting LED and is typically rated as a one-watt LED or greater. LED 210 is typically provided by the manufacturer in the form of an integrated package including a small heat sink, e.g. a thermally conductive disc, on which the actual diode element that emits light is mounted and encapsulated in clear plastic to provide a lens, and from which two electrical contacts 212, 214 extend for making electrical connection to the diode element.

Electronic circuit board 220 typically has two conductive areas 202, 204 to which electrical contacts 212, 214 of LED 210 are electrically and mechanically connected, e.g., by soldering or by electrically conductive adhesive, so that LED 210 and circuit board 220 are attached to each other and may be handled as an assembly 200. Conductors 340 may be electrically connected to conductive areas 202, 204 of circuit board 220, e.g., by soldering or by electrically conductive adhesive. Circuit board 220 is conveniently circular in shape and has a central opening 206 into which LED 210 is disposed when contacts 212, 214 are connected to conductive areas 202, 204. Specifically, the integral heat sink of LED 210 is disposed in opening 206 so that it is exposed at the rear of LED assembly 200 and may be bonded to circular area 112 of heat sink 100.

LED assembly 200 is preferably attached to circular area 112 of first generally rectangular member 110 of heat sink 100 by bonding with a thermally conductive adhesive so as to provide for the conduction of heat from LED 210 to heat sink 100, thereby to reduce the temperature to which LED 210 rises when energized to less than, e.g., 200° C. Desirably, because LED 210 is exposed at the rear of LED assembly 200 through opening 206, the heat sink integral to LED 210 is thermally bonded directly to heat sink 100, thereby to increase heat transfer from LED 210 to heat sink 100. It is noted that circuit board 220 may be provided for convenience in assembly and attachment of LED 210 to heat sink 100 and in making electrical connections to LED 210, but circuit board 220 is not necessary to the satisfactory operation of light 10, 10' as described.

LED 210 is desirably placed in a predetermined location on heat sink 100 so that when heat sink 100 is in light 10, LED 210 and reflector 30 of light 10 will be in desired relative positions for producing a beam of light of a desired shape. Proper relative positioning may be provided by positioning and bonding LED 210 on heat sink 100 within suitable tolerance, and by positioning heat sink 100 in light 10 within suitable tolerance. To this end, heat sink 100 may include alignment features, e.g., alignment holes 116, to aid in properly positioning LED 210 in relation to heat sink 100.

For example, heat sink 100 may include two or more alignment holes 116 the locations of which are accurately known with respect to the center of circular area 112 of heat sink 100. An alignment tool may be provided that has two alignment features that are in known positions for engaging alignment features 116 of heat sink 100, e.g., two posts or projections that may be inserted into alignment holes 116. The alignment tool may also have a recess into which LED 210, specifically the plastic lens of LED 210, fits so as to be in a known position relative to the alignment projections thereof that engage alignment holes 116. Thus, when LED 210 or LED assembly 200 is placed in the alignment tool and the alignment tool is placed adjacent heat sink 100 with its alignment projections in alignment holes 116 of heat sink 100, LED 210 will be in the desired location on heat sink 100 to within the desired tolerance, thereby to properly align with reflector 30 of light 10.

Alternatively and optionally, circuit board 220 may have an alignment hole 222 therein for positioning LED 210 in a known predetermined location relative to circuit board 220, or for engaging a corresponding alignment feature, e.g., a projection or post, of the alignment tool. Where alignment hole 222 is utilized for positioning LED 210, LED 210 is accurately located in relation to circuit board 220. Alternatively, central opening 206 of circuit board 220 may be accurately shaped and sized to receive LED 210 with suitable accuracy so that LED 210 and circuit board 220 are accurately positioned in relation to each other. Alternatively, the alignment tool may have a feature that engages alignment hole 222, which may be used so that LED 210 and LED assembly 200 can be placed on and bonded to heat sink 100 with suitable tolerance.

In a typical assembly sequence, LED 210 and wires 340 are soldered to circuit board 220, thermally conductive adhesive is applied to LED assembly 200 or to circular area 112 of heat sink 100, LED assembly 200 is placed into the alignment tool, the alignment tool is placed adjacent heat sink 100 with its alignment projections in alignment holes 116 thereof to press LED assembly towards heat sink 100 so that it becomes thermally bonded thereto by the thermally conductive adhesive. Alternatively, thermally conductive adhesive may be placed on LED 210 in sufficient amount that it will spread to bond circuit board 220 as well as LED 210 to heat sink 100. In either case, a predetermined amount of adhesive is typically dispensed onto heat sink region 112 or onto the rear surface of LED 210, and the adhesive spreads when LED 210 is pressed against heat sink raised region 112 so as to bond both LED 210 and optional circuit board 220 thereto. Circuit board 300 may then be placed in groove 136 and adjacent to second generally rectangular member 120 and attached thereto by a screw 305, circuit board 400 may be placed into grooves 138, and wires 340 and 430 may be soldered to circuit boards 300 and 400. Such assembly sequence may be automated in whole or in part, or may be performed manually.

Heat sink may 100 may include raised projections or lugs 118 to provide sufficient material into which to open alignment holes 116. In the example embodiment illustrated, lugs 118 are larger than needed for alignment holes 116 so that lugs 118 also provide material into which holes 102 may be made from the rear of heat sink 100.

Heat sink 100 may also have recesses, cut-outs, notches and/or grooves to provide clearance or additional clearance for certain elements. For example, first generally rectangular member 110 may have recesses, notches or grooves 117 in the edge thereof adjacent to circuit board 400 for providing clearance for ends of contact springs 420 that extend through circuit board substrate 410 of circuit board 400 and are soldered thereto, and may have a recess, notch or groove 119 for facilitating placement of circuit board 400 when conductors 430 are attached thereto. Second generally rectangular member 120 may have cut-outs or notches 128 through which conductors 340 and 430 may pass for connection to circuit board 300.

In an example embodiment, heat sink 100 is of die-cast aluminum and has an anodized surface coating so as to be electrically insulated while being highly thermally conductive, as is preferred. Such heat sink 100 is a single unitary piece of thermally conductive material, and could also be made by machining, molding, forging, or other suitable method. Alternatively, any or all of the first generally rectangular member 110, the second generally rectangular member 120, and the elongated members 130 of heat sink 100 could be made as separate pieces from thermally conductive material, and then integrally joined, e.g., by welding, by brazing, by soldering, by a permanent adhesive, by a permanent thermally conductive adhesive, or by any combination thereof, to form heat sink 100.

In the example embodiment, LED 210 is a type LXHL-PW09 or K2 white light emitting diode available as LUXEON® LEDs from Lumiled Lighting, U.S., LLC, located in San Jose, Calif. Other examples of high-power LEDs include LEDs available from sources such as Nichia Semiconductor located in Tokushima, Japan, Seoul Semiconductor located in Korea, Cree Inc. located in Durham, N.C., OSRAM Semiconductor located in Regensburg, Germany, and CML Innovative Technologies located in Hackensack, N.J. LUXEON® and other LEDs are available, e.g., in one watt, three waft, five waft, and other power levels, for producing "white" light as well as other colors of light, e.g., red, green, blue, amber, and the like. LED 210 is bonded to heat sink 100 by type I-4173 thermally conductive adhesive available from Dow Corning located in Midland, Mich. Suitable adhesive materials may also include, e.g., STYCAST #4954 and #5954 silicone high temperature encapsulants, and STYCAST #4952 epoxy, which are available from Emerson & Cuming located in Billerica, Mass. Housing 20 of light 10 may be of type ST801 nylon available from Clariant Corporation located in Charlotte, N.C., or may be of another suitable material, such as a nylon, ABS plastic, polystyrene, or of any other suitable plastic, and lens 32 may be of LEXAN® plastic available from General Electric Company, GE Plastics, located in New York, polycarbonate or other suitable plastic or glass.

Figure 4A:
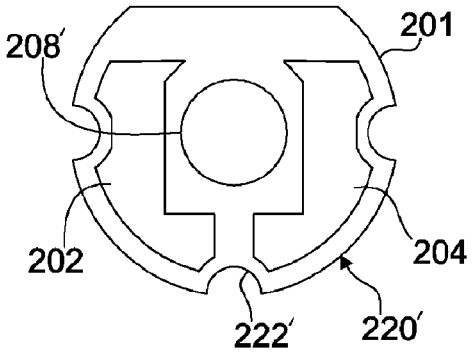
FIGS. 4A and 4B are plan views of alternative example embodiments of a circuit board of an example LED assembly as shown in FIGS. 2 and 4.
Figure 4B:
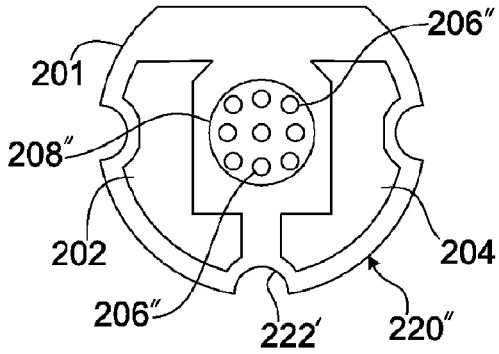

FIGS. 4A and 4B are plan views of alternative example embodiments of circuit board 220 of LED assembly 200 as shown in FIGS. 2 and 4. Electrical circuit board 220' of FIG. 4A has a generally circular periphery 201 and has one or more alignment openings 222', such as a slot or notch 222', for suitably aligning circuit board 220' and LED 210 of LED assembly 200 on heat sink 100 in similar manner to that described herein in relation to circuit board 220. Circuit board 220' typically includes an electrically insulating substrate, e.g., of FR4 material, on which are electrically conductive contact areas 202 and 204, e.g., of copper, to which the electrical leads 212, 214 of LED 210 are respectively electrically connected, e.g, by soldering, and further has a centrally located contact area 208', of copper, to which the base of LED 210 is mechanically and thermally coupled, e.g, by soldering. In a preferred arrangement, the base and electrical leads 212, 214 of LED 210 are electrically and mechanically connected to contact areas 208', 202, 204, respectively, by reflow soldering or another soldering operation, thereby to thermally bond LED 210 to circuit board 220' of LED assembly 200. Circuit board 220' differs from circuit board 220 in that it does not have a central opening 206 in which LED 210 is disposed, and heat may be conducted away from the base of LED 210 to heat sink 100 through circuit board 220' which is preferably relatively thin, e.g., typically less than about 1.0 mm (about 0.04 inch). LED assembly 200 including LED 210 and circuit board 220 is preferably thermally bonded to heat sink 100 as described herein.

Electrical circuit board 220" of FIG. 4B has a generally circular periphery 201 and has one or more alignment openings 222', such as a slot or notch 222', for suitably aligning circuit board 220" and LED 210 of LED assembly 200 on heat sink 100 in similar manner to that described herein in relation to circuit board 220. Circuit board 220" typically includes an electrically insulating substrate, e.g., of FR4 material, on which are electrically conductive contact areas 202 and 204, e.g., of copper, to which the electrical leads 212, 214 of LED 210 are respectively electrically connected, e.g, by soldering, and further has a centrally located contact area 208", e.g., of copper, to which the base of LED 210 is mechanically and thermally coupled, e.g, by soldering. Contact area 208" preferably has a plurality of relatively small openings or holes 206" through circuit board 220", and plural holes 206" are preferably filled with a thermally conductive material. In a preferred arrangement, the base and electrical leads 212, 214 of LED 210 are electrically and mechanically connected to contact areas 208", 202, 204, respectively, by reflow soldering or another soldering operation, thereby to thermally bond LED 210 to circuit board 220" of LED assembly 200. Circuit board 220" differs from circuit board 220 in that it does not have a large central opening 206, but has plural smaller openings 206" that may be filled with thermally conductive material through which heat may be conducted away from the base of LED 210 to heat sink 100 through circuit board 220". Circuit board 220" is preferably relatively thin, e.g., typically less than about 1.0 mm (about 0.04 inch), and typically about 0.75 mm (about 0.03 inch). LED assembly 200 including LED 210 and circuit board 220" is preferably thermally bonded to heat sink 100 as described herein.

Also in a preferred arrangement, plural holes 206" of circuit board 220" may be conductive vias that are filled with copper, e.g., plated copper as in plated full plated-through holes, or with solder, e.g., in the reflow soldering or in another soldering step, or another thermally conductive material, e.g., a thermally conductive epoxy or other thermally conductive adhesive, such as the adhesive used to attach LED assembly 200 to heat sink 100. Plural holes 206" preferably provide thermally conductive paths through circuit board 220" over a substantial portion of the area of contact area 208" and so are typically substantially smaller in diameter than is contact area 208". For example, the diameter of holes 206" may be about 1.0 mm (about 0.04 inch), but may be larger or smaller, where openings/holes 206" are plated holes, or are conductive vias, or are plated-through holes, or are plated full plated-through holes, e.g., plated-through holes that are plated full with copper, or are holes that are filled with solder. The pattern, size (or sizes) and number of holes 206", and the material, if any, that fills holes 206", may be selected for providing a desired thermal conductivity through circuit board 220", e.g., between LED 210 and heat sink 100.

It is noted that in each of the arrangements of FIGS. 4, 4A and 4B, LED 210 is attached to circuit board 220, 220', 220", and/or is thermally bonded to heat sink 100 through circuit board 220, 220', 220", whether directly, e.g., by being disposed in opening 206, or indirectly, e.g., by being attached and/or thermally bonded to contact area 208', 208". LED 210 is supported by circuit board 220, 220', 220". LED 210 also may be attached to and/or thermally bonded to heat sink 100 without a circuit board 220, 220', 220". Thermal bonding of LED 210 is preferably provided by solder, by a highly thermally conductive epoxy or by another highly thermally conductive adhesive, e.g., of the sorts described herein. Thermal bonding of LED assembly 200 is preferably provided by a highly thermally conductive epoxy or by another highly thermally conductive adhesive, e.g., of the sorts described herein.

Figure 5:
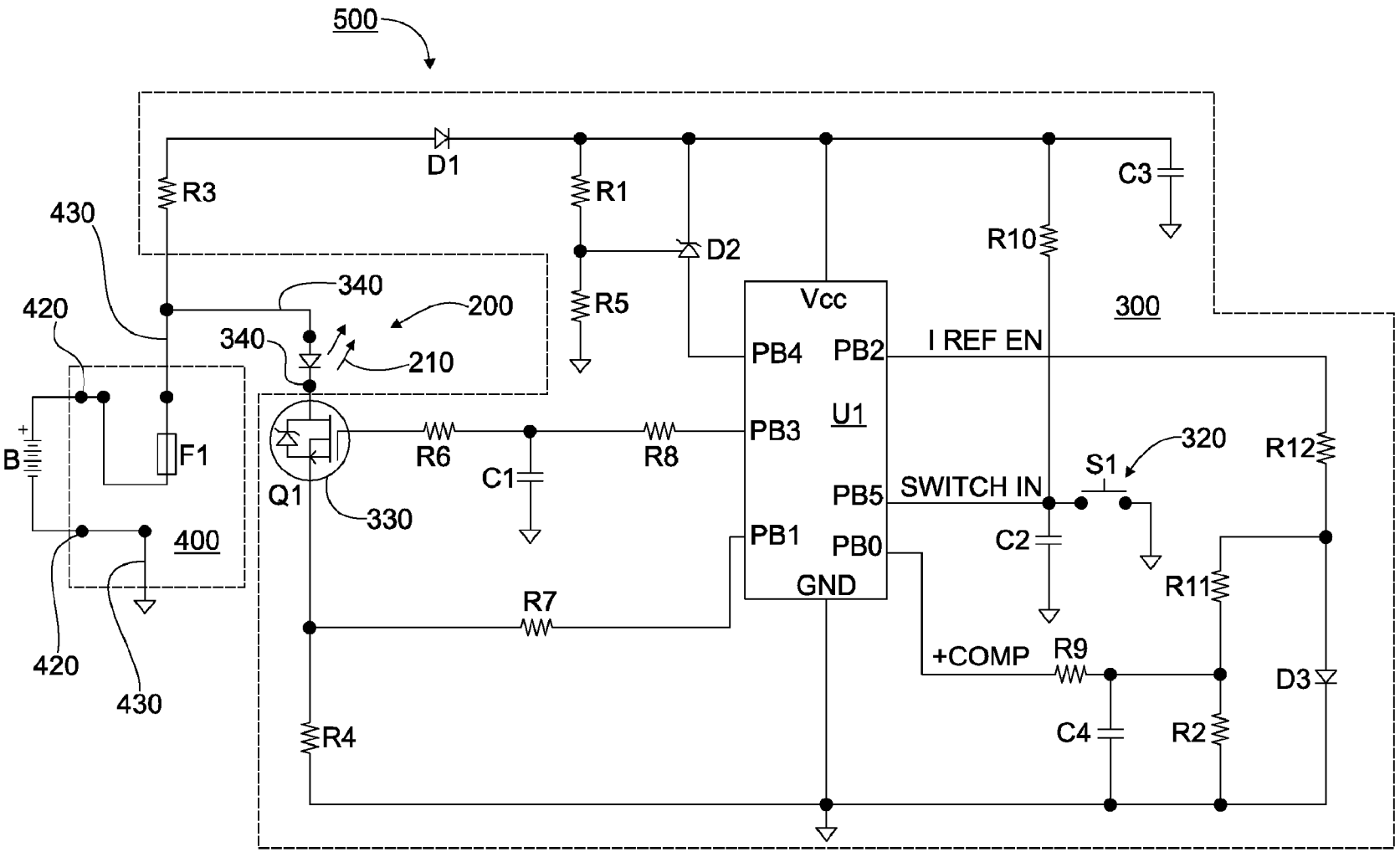
FIG. 5 is a schematic diagram of an example electronic circuit useful with the light of FIGS. 1-4.

FIG. 5 is a schematic diagram of an example electronic circuit 500 useful with the light 10, 10' of FIGS. 1-4. Circuit 500 is responsive to closures of switch 320, which *is connected to microprocessor U1 via the SWITCH IN pin PB5 and* typically may be a [pushbufton] *pushbutton* switch having normally open momentary contacts S1, for selectively applying power from battery B to LED 210 for energizing LED 210 for producing light. Operating conditions or modes for LED light source 210 that are selectable by pressing pushbutton switch S1, 320 may include, for example, some or all of momentary ON, continuous ON, OFF, safe, dimmed, cyclical dimming, flashing, blinking, timed ON, and other conditions. Such operating conditions may be selected by some or all of momentarily pressing [pushbufton] *pushbutton* switch 320, by pressing and holding switch S1 320 for a given time, by pressing switch S1, 320 two or more times within a given time or times, or any combination of the foregoing, or any other desired switch sequence. Capacitor C2 may reduce unwanted signals generated when switch contacts S1 open and/or close.

Circuit 500 includes various electronic components that are disposed on electronic circuit board 300, on electronic circuit board 400, in LED assembly 200, and on heat sink 100. Battery B is an electrical power source that provides electrical power for selectively energizing LED 210 responsive to the other components of circuit 500 and is connected to circuit 500 via contact springs 420 on circuit board 400. Optionally, a fuse F1 may be provided, *e.g., in series with battery B,* e.g., on circuit board 400, to limit the current that may flow under fault conditions, but fuse F1 always must allow a greater current level than the highest current that flows under normal operation.

Connection between circuit boards 300 and 400 is via conductors 430 and relatively high current normally flows through the path including *fuse F1,* conductors 340, LED 210, control transistor Q1, 330 and current sensing resistor R4. Current sensing resistor R4 may cooperate with integrated circuit U1 by providing to pin PB1 thereof a feedback signal representative of the current flowing through LED 210 to control the value of current flowing in FET [210] *Q1, 330* with resistor R4 providing a feedback signal via resistor R7 to pin 6, PB1, of circuit U1 via resistor R7 and circuit U1 providing a correction signal, PWM OUT, via resistors R6 and R8 to drive control transistor Q1, with capacitor C1 providing low-pass filtering. The signal from pin 6, PWM OUT, of circuit U1 may be a pulse width modulated (PWM) signal that is low pass filtered by resistors R6, R8 and capacitor C1 to provide an appropriate drive signal for controlling transistor Q1. It is noted that control transistor Q1, a MOSFET transistor, is an example of a control device 330 for controlling the current flowing through LED 210 and device 330 is preferably mounted on electronic circuit board 300 proximate to the location attached to heat sink 100 by fastener 305.

Integrated circuit U1 provides a voltage at pin PB2, REF EN, that is at least in part responsive to the selected operating condition for establishing a reference potential for controlling the current flowing through LED 210. The voltage from pin PB2, REF EN, of circuit U1 is reduced by a first voltage divider including resistor R12 and diode D3, and the voltage across diode D3 is further reduced by the voltage divider formed by resistors R1 and R12 and is provided via resistor R9 to circuit U1 at pin PB0, +COMP, thereof as a reference for a feedback loop controlling current flowing through LED 210 using a feedback signal from resistor R4 as described above.

Power from battery B is provided to pin Vcc of integrated circuit U1 via resistor R3, diode D1, and is filtered to remove transient voltage changes, if any, by capacitor C3 having substantial capacitance. Integrated circuit U1 receives at pin Vcc either the voltage of battery B (less a small voltage drop across resistor R3 and diode D1) or a controlled predetermined voltage, e.g., 3.0 volts, controlled by reference diode D2.

When light 10, 10' is in certain operating conditions, e.g., conditions wherein the frequency of an oscillator internal to circuit U1 is desired to be operated at a relatively precise frequency such as a mode involving timing, pin PB4, 3.0V ENABLE, of integrated circuit pulls down towards ground GND potential (a LOW output condition) so that reference diode D2 is essentially connected between pins Vcc and GND of circuit U1 and is turned ON, thereby to control the Vcc voltage applied to circuit U1 to the predetermined voltage produced by voltage reference diode D2 at the enable input to circuit U1, e.g., 3.0 volts. Diode D2 receives feedback of a predetermined fraction of the voltage of Vcc via resistors R1, R5 thereby to establish the value of the predetermined voltage, e.g., 3.0 volts, that it provides. The relatively precise reference voltage thus provided by reference diode D2 helps to stabilize operation of microprocessor U1, e.g., as the voltage from battery B varies over its operating life. Under this condition, the voltage drop across resistor R3 may be a substantial portion of the voltage of battery B.

Under other operating conditions, e.g., conditions wherein the frequency of an oscillator internal to circuit U1 is not important or wherein it may be desirable to save the power consumed by diode D2 when it is providing the predetermined voltage, pin PB4, 3.0V ENABLE, of integrated circuit is released to pull up towards Vcc potential (a HIGH output condition) so that reference diode D2 is essentially disconnected from pin GND of circuit U1 thereby to not function to control the Vcc voltage applied to circuit U1, whereby circuit U1 receives a supply voltage Vcc that is close to battery B voltage.

In the illustrated example embodiment of circuit 500, LED 210 is preferably a type LXHL-PW09 white LED as above, MOSFET transistor Q1 is preferably a type NTD40N03 available from ON Semiconductor located in Phoenix, Ariz., integrated circuit U1 is preferably a type ATTINY11 microprocessor that is available from Atmel Corporation located in San Jose, Calif., and reference diode D2 is a type TL432ACDBZR available from Texas Instruments located in Dallas, Tex.

A light 10, 10' may comprise a light emitting diode 210 selectively energizable for producing light; an electronic circuit 300, 500 for selectively energizing light emitting diode 210; a heat sink 100 of a thermally conductive material, wherein light emitting diode 210 is thermally bonded to heat sink 100, wherein electronic circuit 300, 500 is attached to heat sink 100; and a case 20 for receiving heat sink 100, light emitting diode 210, electronic circuit 300, 500, and a source B of electrical power. Electronic circuit 300, 500 may be disposed on an electronic circuit board 300, 310 that is attached to heat sink 100. Electronic circuit board 310 may include vias and/or a conductor for increasing the thermal conductivity of electronic circuit board 310 proximate a location at which electronic circuit board 310 is attached to heat sink 100. Electronic circuit 300, 500 may include an electronic component 330 for selectively controlling the energizing of light emitting diode 210, wherein electronic component 330 is disposed on electronic circuit board 310 proximate the location at which electronic circuit board 300, 310 is attached to heat sink 100. Electronic circuit board 300, 310 may be attached to heat sink 100 without thermally conductive bonding material. Heat sink 100 may maintain light emitting diode 210 and electronic circuit 300, 310 at a temperature less than 200° C. in an ambient 40° C. environment under normal operation and under a fault condition. Heat sink 100 may be of a thermally conductive material comprising a first generally rectangular planar member 110 for supporting light emitting diode 210 and a second generally rectangular member 120 integrally joined to first generally rectangular member 110 and for supporting electronic circuit 300, 500, and may further include two optional opposing elongated members 130 each integrally joined to first and second rectangular planar members 110, 120 proximate opposing edges thereof. Heat sink 100 may have at least two spaced apart alignment features 116 for positioning light emitting diode 210 on a predetermined region of heat sink 100 for bonding light emitting diode 210 thereto. Electronic circuit 300, 500 for energizing light emitting diode 210 may receive a voltage from a source B of electrical power and may provide a predetermined current to light emitting diode 210, and may increase the voltage from the source B of electrical power if necessary to provide the predetermined current.

A light 10, 10' may comprise a heat sink 100 of a thermally conductive material comprising a first generally rectangular planar member 110 and a second generally rectangular member 120 integrally joined to first generally rectangular member 110; a light emitting diode 210 attached to a broad surface of first generally rectangular planar member 110 of heat sink 100; an electronic circuit board 300 comprising circuitry 500 for energizing light emitting diode 210, and wherein electronic circuit board 300 is attached to second generally rectangular planar member 120. Light 10 may comprise a case 20 for receiving heat sink 100, light emitting diode 210, electronic circuit board 300, and a source B of electrical power. Light emitting diode 210 may be bonded to a central region of the broad surface of first generally rectangular member 110 of heat sink 100 by a thermally conductive adhesive. Light 10, 10' may further comprise a second electronic circuit board 220, 220', 220" for receiving light emitting diode 210 and having conductive areas 202, 204 thereon, wherein light emitting diode 210 is bonded to the central region of broad surface 112 of first generally rectangular member 110 of heat sink 100 through second electronic circuit board 220, 220', 220" and wherein electrical contacts 212, 214 of light emitting diode 210 are electrically connected to the conductive areas 202, 204 of second electronic circuit board 220, 220', 220". Electronic circuit board 220, 220', 220" may have a central opening 206 therein for receiving light emitting diode 210 or may have a contact area 208', 208" for receiving LED 210 or may have a contact area 208" including conductive vias, openings, holes, plated holes, plated through holes, plated full plated through holes, and/or other openings 206" for receiving LED 210, or may have a combination thereof. First generally rectangular member 110 of heat sink 100 may have at least two spaced apart alignment features 116 for positioning light emitting diode 210 on a central region of a broad surface 112 of first generally rectangular member 110 of heat sink 100 for bonding light emitting diode 210 to heat sink 100. Electronic circuit board 300 may be supported at one end by a fastener 305 engaging second generally rectangular member 120 of heat sink 100. An electronic component 330 for controlling the energization of light emitting diode 210 may be disposed on electronic circuit board 300, 310 proximate fastener 305. Electronic circuit board 300, 310 may be attached to heat sink 100 without thermally conductive bonding material. Heat sink 100 may be fabricated from a single piece of a thermally conductive material, e.g., by machining, by casting, by die casting, by molding, or by forging the single piece of a thermally conductive material. First generally rectangular planar member 110 and second generally rectangular member 120 may be fabricated separately from thermally conductive material, e.g., each of first generally rectangular planar member 110 and second generally rectangular member 120 of heat sink 100 may be fabricated by machining, by casting, by die casting, by molding, by forging, or by any combination thereof, and first and second generally rectangular planar members 110, 120 may be integrally joined by welding, by brazing, by soldering, by a permanent adhesive, by a permanent thermally conductive adhesive, or by any combination thereof. Circuitry 500 for energizing light emitting diode 100 may receive a voltage from the source B of electrical power and may provide a predetermined current to light emitting diode 210, and may increase the voltage from the source B of electrical power if necessary to provide the predetermined current. Light 10, 10' may further comprise a second electronic circuit board 400, 410 including terminals 420 for making electrical connection to a battery B, wherein second electronic circuit board 400, 410 may be attached to heat sink 100 juxtaposed from electronic circuit board 300, 310 and proximate an edge of first generally rectangular member 110. Heat sink 100 may maintain light emitting diode 210 and energizing circuitry 500 of electronic circuit board 300, 310 at a temperature less than 200° C. in normal operation and under a fault condition. First generally rectangular member 110 of heat sink 100 may be thicker in a central region 112 whereat light emitting diode 210 is attached thereto than in a surrounding region.

A light 10, 10' may comprise a heat sink 100 of a thermally conductive material, heat sink 100 comprising a first generally rectangular planar member 110 defining four edges and two opposing broad surfaces, two opposing elongated members 130 each [integrallyjoined] *integrally joined* to first rectangular planar member 100 proximate two opposing edges thereof, and a second generally rectangular member 120 integrally joined at opposing ends thereof to the two elongated members 130 and integrally joined to first generally rectangular member 110; a light emitting diode 210 bonded by a thermally conductive adhesive to a central region 112 of a broad surface of first generally rectangular planar member 110 of heat sink 100 between the two elongated members 130 thereof; wherein heat sink 100 has at least two spaced apart alignment features 116 for positioning light emitting diode 210 on the central region 112 of the broad surface of first generally rectangular member 110 of heat sink 100 for the bonding of light emitting diode 210 thereto; a first electronic circuit board 300, 310 adjacent second generally rectangular member 120 of heat sink 100 comprising circuitry 500 for energizing light emitting diode 210, wherein first electronic circuit board 300, 310 is supported at one end by a fastener 305 engaging second generally rectangular member 120 of heat sink 100; and a second electronic circuit board 220, 220', 220" supporting light emitting diode 210, wherein electrical contacts 212, 214 of light emitting diode 210 are electrically connected to respective conductive areas 202, 204 of second electronic circuit board 220, 220', 220" and to first electronic circuit board 300, 310. An electronic component 330 for controlling the energization of light emitting diode 210 may be disposed on first electronic circuit board 300, 310 proximate fastener 305. First electronic circuit board 300, 310 may be attached to heat sink 100 without thermally conductive bonding material. Heat sink 100 may be fabricated from a single piece of a thermally conductive material, e.g., by machining, by casting, by die casting, by molding, or by forging the single piece of a thermally conductive material. First generally rectangular planar member 110, the two opposing elongated members 130 and second generally rectangular member 120 may be fabricated separately from thermally conductive material, wherein each of first generally rectangular planar member 110, the two opposing elongated members 130 and second generally rectangular member 120 of heat sink 100 may be fabricated by machining, by casting, by die casting, by molding, by forging, or by any combination thereof, and wherein first and second generally rectangular planar members 110, 120 and the two elongated members 130 may be integrally joined by welding, by brazing, by soldering, by a permanent adhesive, by a permanent thermally conductive adhesive, or by any combination thereof. Circuitry 500 for energizing light emitting diode 210 may receive a voltage from the source B of electrical power and may provide a predetermined current to light emitting diode 210, and may provide a voltage greater than the voltage from the source B of electrical power when necessary to provide the predetermined current. Light 10, 10' may further comprise a third electronic circuit board 400, 410 including terminals 420 for making electrical connection to a battery B, wherein third electronic circuit board 400, 410 may be attached to heat sink 100 between the two elongated members 130 thereof juxtaposed from first electronic circuit board 300, 310 and proximate an edge of first generally rectangular member 110. Heat sink 100 may maintain light emitting diode 210 and the energizing circuitry 500 of electronic circuit board 300, 310 at a temperature less than 200° C. in normal operation and under a fault condition. The second electronic circuit board 220, 220', 220" supporting said light emitting diode may comprise: second circuit board 220 having an opening 206 therethrough in which light emitting diode 210 is disposed; or second circuit board 200', 220" having a contact area 208', 208" thereon to which light emitting diode 210 is attached; or second circuit board 220" having a contact area 208" thereon to which light emitting diode 210 is attached, wherein contact area 208" includes a plurality of openings 206", of holes 206", of conductive vias 206", of plated-through holes 206", of plated full plated-through holes 206", and/or of solder filled holes 206", in second circuit board 220, 220', 220".

A light 10 may comprise a heat sink 100 of a thermally conductive material, a light emitting diode 210 selectively energizable for producing light, wherein light emitting diode 210 is thermally bonded to heat sink 100, an electronic circuit 300, 500 for selectively energizing light emitting diode 210, wherein electronic circuit 300, 500 has an attachment location at which it is attached to heat sink 100, electronic circuit 300, 500 further including means for reducing thermal resistance between a heat generating component 330 thereof and the attachment location thereof; and a case 20 for receiving heat sink 100, light emitting diode 210, electronic circuit 300, 500, and a source B of electrical power. Electronic circuit 300, 500 for selectively energizing light emitting diode 210 may be disposed on an electronic circuit board 300, 310 that is attached to heat sink 100. Electronic circuit board 310 may include vias and/or a conductor for increasing the thermal conductivity of electronic circuit board 310 proximate a location at which electronic circuit board 310 is attached to heat sink 100. Electronic circuit 300, 500 may include an electronic component 330 for selectively controlling the energizing of light emitting diode 210, wherein electronic component 330 is disposed on electronic circuit board 310 proximate the location at which electronic circuit board 310 is attached to heat sink 100. Electronic circuit board 310 may be attached to heat sink 100 without thermally conductive bonding material. Means for reducing thermal resistance between the heat generating component 330 and the attachment location may include a substantial electrical conductor area, a thicker electrical conductor, one or more conductive vias, or any combination thereof, proximate to the attachment location of electronic circuit 300, 500. Heat sink 100 may maintain light emitting diode 210 and electronic circuit 300, 500 at a temperature less than 200° C. in an ambient 40° C. environment under normal operation and under a fault condition. Electronic circuit 300, 500 may include a pair of contact springs 420 extending away from heat sink 100 for making electrical contact with the source B of electrical power. Heat sink 100 of a thermally conductive material may comprise a first generally rectangular planar member 110 for supporting light emitting diode 210, and a second generally rectangular member 120 integrally joined to the first generally rectangular member 110 and for supporting electronic circuit 300, 500. Heat sink 100 may have at least two spaced apart alignment features 116 for positioning light emitting diode 210 on a predetermined region of heat sink 100 for bonding light emitting diode 210 thereto. Electronic circuit 300, 500 for selectively energizing light emitting diode 210 may receive a voltage from the source B of electrical power and may provide a predetermined current to light emitting diode 210, and may increase the voltage from the source B of electrical power if necessary to provide the predetermined current.

A light 10 may comprise a heat sink 100 of a thermally conductive material, a light emitting diode 210 selectively energizable for producing light, wherein light emitting diode 210 is thermally bonded to heat sink 100, an electronic circuit 300, 500 for selectively energizing light emitting diode 210, wherein electronic circuit 300, 500 has an attachment location at which it is attached to heat sink 100, electronic circuit 300, 500 further including a pair of contact springs 420 extending in a direction away from heat sink 100 for contacting a source B of electrical power, and a case for receiving heat sink 100, light emitting diode 210, electronic circuit 300, 500, and source B of electrical power. Electronic circuit 300, 500 for selectively energizing light emitting diode 210 may be disposed on an electronic circuit board 310 that is attached to heat sink 100, and electronic circuit board 310 may include vias and/or a conductor for increasing the thermal conductivity of electronic circuit board 310 proximate a location at which electronic circuit board 310 is attached to heat sink 100. Electronic circuit 300, 500 may include an electronic component 330 for selectively controlling the energizing of light emitting diode 210, wherein electronic component 330 may be disposed on electronic circuit board 310 proximate the location at which electronic circuit board 310 is attached to heat sink 100. Electronic circuit board 310 may be attached to heat sink 100 without thermally conductive bonding material. Electronic circuit 300, 500 may include a substantial electrical conductor area, a thicker electrical conductor, one or more conductive vias, or any combination thereof, proximate to an attachment location of electronic circuit 300, 500 for reducing the thermal resistance between a heat generating component 330 thereof and the attachment location thereof. Heat sink 100 may maintain light emitting diode 210 and electronic circuit 300, 500 at a temperature less than 200° C. in an ambient 40° C. environment under normal operation and under a fault condition. Pair of contact springs 420 may include coiled spring-like structures of electrically conductive wire extending away from heat sink 100 for making electrical contact with terminals of the source B of electrical power. Heat sink 100 of a thermally conductive material may comprise: a first generally rectangular planar member 110 for supporting light emitting diode 210, and a second generally rectangular member 120 integrally joined to the first generally rectangular member 110 and for supporting electronic circuit 300, 500. Heat sink 100 may have at least two spaced apart alignment features 116 for positioning light emitting diode 210 on a predetermined region of heat sink 100 for bonding light emitting diode 210 thereto. Electronic circuit 300, 500 for selectively energizing light emitting diode 210 may receive a voltage from the source B of electrical power and may provide a predetermined current to light emitting diode 210. Electronic circuit 300, 500 for selectively energizing light emitting diode 210 may increase the voltage from the source B of electrical power if necessary to provide the predetermined current.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Another example embodiment of a light and heat sink arrangement may be found in U.S. patent application Ser. No. 11/394,633 filed Mar. 31, 2006, which is hereby incorporated herein by reference in its entirety.

While the present invention has been described in terms of the foregoing example embodiments, variations within the scope and spirit of the present invention as defined by the claims following will be apparent to those skilled in the art. For example, while LED assembly 200 may include LED 210 being attached to an electronic circuit board 220, 220', 220" for convenient assembly, conductors 340 could be directly connected to LED 210 which would be directly bonded to heat sink 100.

The substantial electrical conductor area, thicker electrical conductor, conductive vias, or another arrangement, of circuit substrate 310 proximate to the location thereon where fastener 305 attaches circuit board 300 to heat sink 100 may be electrically insulated from electronic circuit 300, 500 and/or from fastener 305 and/or from heat sink 100, or may not be insulated from electronic circuit 300, 500 and/or from fastener 305 and/or from heat sink 100, any of which arrangements can be compatible with the function of reducing the thermal resistance between control component 330 and heat sink 100.

Further, alignment features such as alignment holes 116 of heat sink 100 could be alignment projections, such as posts or lugs, that engage complementary alignment features, e.g., holes or recesses, of the alignment tool.

In addition to the example electronic circuit illustrated in FIG. 5, other electronic circuits could be employed, including a simple circuit wherein switch 320 operates to directly apply and remove power from LED 210 or does so by directly causing a control device 330, e.g. a MOSFET transistor, to selectively become conductive and non-conductive. Control device could be controlled by a toggle type flip flop that changes state in response to closures of contacts S1, 320. Further, control device 330 could be a simple electronic switching device or may be used to regulate or control current flowing through LED 210 or may be used to transform and or condition power from the power source to a voltage and/or current suitable for LED 210, either for continuous, variable or intermittent operation.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A *portable* light comprising:

a heat sink of a thermally conductive material comprising a first generally rectangular planar member, and a second generally rectangular member integrally joined to the first generally rectangular member;

a light emitting diode attached to a broad surface of the first generally rectangular planar member of said heat sink;

an electronic circuit board comprising circuitry for controlling the energizing of said light emitting diode, wherein said electronic circuit board is attached to the second generally rectangular planar member,

*the circuitry of said electronic circuit board including an electronic component that generates heat when energizing said light emitting diode and generates greater heat under a fault condition, wherein said electronic compo-*

*nent is thermally coupled by said electronic circuit board to the second generally rectangular planar member of said heat sink to prevent the temperature of said electronic component from increasing excessively under the fault condition*; and a case for receiving said heat sink, said light emitting diode, said electronic circuit board, and a source of electrical power.

2. The *portable* light of claim 1 wherein said light emitting diode is bonded to a central region of the broad surface of the first generally rectangular member of said heat sink by a thermally conductive adhesive.

3. The *portable* light of claim 1 further comprising a second electronic circuit board for receiving said light emitting diode and having conductive areas thereon, wherein said light emitting diode is bonded to the central region of the broad surface of the first generally rectangular member of said heat sink through said second electronic circuit board and wherein the electrical contacts of said light emitting diode are electrically connected to the conductive areas of said second electronic circuit board.

4. The *portable* light of claim 1 wherein the first generally rectangular member of said heat sink has at least two spaced apart alignment features for positioning said light emitting diode on a central region of a broad surface of the first generally rectangular member of said heat sink for bonding said light emitting diode to said heat sink.

5. The *portable* light of claim 1 wherein said electronic circuit board is supported at one end by a fastener engaging the second generally rectangular member of said heat sink.

6. The *portable* light of claim 5 [further comprising an] *wherein the* electronic component *is* for controlling the energization of said light emitting diode, wherein said electronic component is disposed on said electronic circuit board proximate said fastener.

7. The *portable* light of claim 6 wherein said electronic circuit board includes a substantial electrical conductor area, a thicker electrical conductor, one or more conductive vias, or any combination thereof, proximate said fastener for reducing thermal resistance between said electronic component and the fastener.

8. The *portable* light of claim 1 wherein said electronic circuit board is attached to said heat sink without thermally conductive bonding material.

9. The *portable* light of claim 1 wherein said heat sink is fabricated from a single piece of a thermally conductive material.

10. The *portable* light of claim 9 wherein said heat sink is fabricated by machining, by casting, by die casting, by molding, or by forging the single piece of a thermally conductive material.

11. The *portable* light of claim 1 wherein the first generally rectangular planar member and the second generally rectangular member are fabricated separately from thermally conductive material, and wherein the first and second generally rectangular planar members are integrally joined by welding, by brazing, by soldering, by a permanent adhesive, by a permanent thermally conductive adhesive, or by any combination thereof.

12. The *portable* light of claim 11 wherein each of the first generally rectangular planar member and the second generally rectangular member of said heat sink is fabricated by machining, by casting, by die casting, by molding, by forging, or by any combination thereof.

13. The *portable* light of claim 1 wherein said circuitry for energizing said light emitting diode receives a voltage from the source of electrical power and provides a predetermined current to said light emitting diode, and increases the voltage from the source of electrical power if necessary to provide the predetermined current.

14. The *portable* light of claim 1 further comprising a pair of contact springs extending away from said heat sink for electrically connecting said electronic circuit board to the source of electrical power.

15. The *portable* light of claim 1 further comprising a second electronic circuit board including terminals for making electrical connection to a battery, wherein said second electronic circuit board is attached to said heat sink juxtaposed from said electronic circuit board and proximate an edge of the first generally rectangular member.

16. The *portable* light of claim 1 wherein said heat sink maintains said light emitting diode and the energizing circuitry of said electronic circuit board at a temperature less than 200° C. in normal operation and under a fault condition.

17. The *portable* light of claim 1 wherein the first generally rectangular member of said heat sink is thicker in a central region whereat said light emitting diode is attached thereto than in a surrounding region.

18. A light comprising:

a heat sink of a thermally conductive material, said heat sink comprising a first generally rectangular planar member defining four edges and two opposing broad surfaces, two opposing elongated members each integrally joined to the first rectangular planar member proximate two opposing edges thereof, and a second generally rectangular member integrally joined at opposing ends thereof to the two elongated members and integrally joined to the first generally rectangular member;

a light emitting diode attached to a broad surface of the first generally rectangular planar member of said heat sink between the two elongated members thereof;

an electronic circuit board comprising circuitry for energizing said light emitting diode, wherein said electronic circuit board is attached to the second generally rectangular planar member between the two opposing elongated members; and a case for receiving said heat sink, said light emitting diode, said electronic circuit board, and a source of electrical power.

19. The light of claim 18 wherein said light emitting diode is bonded to a central region of the broad surface of the first generally rectangular member of said heat sink by a thermally conductive adhesive.

20. The light of claim 18 further comprising a second electronic circuit board for receiving said light emitting diode and having conductive areas thereon, wherein said light emitting diode is bonded to the central region of the broad surface of the first generally rectangular member of said heat sink through said second electronic circuit board and wherein the electrical contacts of said light emitting diode are electrically connected to the conductive areas of said second electronic circuit board.

21. The light of claim 18 wherein the first generally rectangular member of said heat sink has at least two spaced apart alignment features for positioning said light emitting diode on a central region of a broad surface of the first generally rectangular member of said heat sink for bonding said light emitting diode to said heat sink.

22. The light of claim 18 wherein said electronic circuit board is supported at one end by a groove in a first one of the two elongated members of said heat sink and at an opposite end by a fastener engaging the second generally rectangular member of said heat sink.

23. The light of claim 22 further comprising an electronic component for controlling the energization of said light emitting diode, wherein said electronic component is disposed on said electronic circuit board proximate said fastener.

24. The light of claim 23 wherein said electronic circuit board includes a substantial electrical conductor area, a thicker electrical conductor, one or more conductive vias, or any combination thereof, proximate said fastener for reducing thermal resistance between said electronic component and said fastener.

25. The light of claim 18 wherein said electronic circuit board is attached to said heat sink without thermally conductive bonding material.

26. The light of claim 18 wherein said heat sink is fabricated from a single piece of a thermally conductive material.

27. The light of claim 26 wherein said heat sink is fabricated by machining, by casting, by die casting, by molding, or by forging the single piece of a thermally conductive material.

28. The light of claim 18 wherein the first generally rectangular planar member, the two opposing elongated members and the second generally rectangular member are fabricated separately from thermally conductive material, and wherein the first and second generally rectangular planar members and the two elongated members are integrally joined by welding, by brazing, by soldering, by a permanent adhesive, by a permanent thermally conductive adhesive, or by any combination thereof.

29. The light of claim 28 wherein each of the first generally rectangular planar member, the two opposing elongated members and the second generally rectangular member of said heat sink is fabricated by machining, by casting, by die casting, by molding, by forging, or by any combination thereof.

30. The light of claim 18 wherein said circuitry for energizing said light emitting diode receives a voltage from the source of electrical power and provides a predetermined current to said light emitting diode, and increases the voltage from the source of electrical power if necessary to provide the predetermined current.

31. The light of claim 18 further comprising a pair of contact springs extending away from said heat sink for electrically connecting said electronic circuit board to a source of electrical power.

32. The light of claim 18 further comprising a second electronic circuit board including terminals for making electrical connection to a battery, wherein said second electronic circuit board is attached to said heat sink between the two elongated members thereof juxtaposed from said electronic circuit board and proximate an edge of the first generally rectangular member.

33. The light of claim 18 wherein said heat sink maintains said light emitting diode and the energizing circuitry of said electronic circuit board at a temperature less than 200° C. in normal operation and under a fault condition.

34. The light of claim 18 wherein the first generally rectangular member of said heat sink is thicker in a central region whereat said light emitting diode is attached thereto than in a surrounding region.

35. A *portable* light comprising:

a heat sink of a thermally conductive material;

a light emitting diode selectively energizable for producing light, wherein said light emitting diode is thermally coupled to said heat sink;

an electronic circuit for selectively energizing said light emitting diode, wherein said electronic circuit includes an electronic circuit board having an attachment location at which it is attached to said heat sink, said electronic circuit including an electronic component for selectively controlling the energizing of said light emitting diode, wherein said electronic component generates heat and is disposed on said electronic circuit board proximate the location at which said electronic circuit board is attached to said heat sink, said electronic circuit board further including a conductive element that reduces the thermal resistance between the heat generating component and the attachment location thereof,

*wherein the electronic component generates greater heat under a fault condition, and wherein said electronic component is thermally coupled by the conductive element of said electronic circuit board to said heat sink to prevent the temperature of said electronic component from increasing excessively under the fault condition*; and a case for receiving said heat sink, said light emitting diode, said electronic circuit, and a source of electrical power.

36. The *portable* light of claim 35 wherein said electronic circuit board includes vias and/or a conductor for increasing a thermal conductivity of said electronic circuit board proximate the location at which said electronic circuit board is attached to said heat sink.

37. The *portable* light of claim 35 wherein said electronic circuit board is attached to said heat sink without thermally conductive bonding material.

38. The *portable* light of claim 35 wherein said [said] conductive element that reduces the thermal resistance between the heat generating component and the attachment location includes a substantial electrical conductor area, a thicker electrical conductor, one or more conductive vias, or any combination thereof, proximate to the attachment location of said electronic circuit.

39. The *portable* light of claim 35 wherein said heat sink maintains said light emitting diode and said electronic circuit at a temperature less than 200° C. in an ambient 40° C. environment under normal operation and under a fault condition.

40. The *portable* light of claim 35 wherein said electronic circuit includes a pair of contact springs extending away from said heat sink for making electrical contact with the source of electrical power.

41. The *portable* light of claim 35 wherein said heat sink of a thermally conductive material comprises: a first generally rectangular planar member for supporting said light emitting diode, and a second generally rectangular member integrally joined to the first generally rectangular member and for supporting said electronic circuit.

42. The *portable* light of claim 35 wherein said heat sink has at least two spaced apart alignment features for positioning said light emitting diode on a predetermined region of said heat sink for bonding said light emitting diode thereto.

43. The *portable* light of claim 35 wherein said electronic circuit for selectively energizing said light emitting diode receives a voltage from the source of electrical power and provides a predetermined current to said light emitting diode.

44. The *portable* light of claim 43 wherein said electronic circuit for selectively energizing said light emitting diode increases the voltage from the source of electrical power if necessary to provide the predetermined current.

45. A *portable* light comprising:

a heat sink of a thermally conductive material;

a light emitting diode selectively energizable for producing light, wherein said light emitting diode is thermally coupled to said heat sink;

an electronic circuit for selectively energizing said light emitting diode, wherein said electronic circuit includes an electronic circuit board having an attachment location at which it is attached to said heat sink, said electronic circuit further including a pair of *electrical* contact springs *supported by and* extending away from said heat sink in the same direction for *electrically* contacting *the terminals of* a source of electrical power; and a case for receiving said heat sink, said light emitting diode, said electronic circuit, and the source of electrical power.

46. The *portable* light of claim 45 wherein said electronic circuit board includes vias and/or a conductor for increasing a thermal conductivity of said electronic circuit board proximate a location at which said electronic circuit board is attached to said heat sink.

47. The *portable* light of claim 45 wherein said electronic circuit includes an electronic component for selectively controlling the energizing of said light emitting diode, wherein said electronic component is disposed on said electronic circuit board proximate the location at which said electronic circuit board is attached to said heat sink.

48. The *portable* light of claim 45 wherein said electronic circuit board is attached to said heat sink without thermally conductive bonding material.

49. The *portable* light of claim 45 wherein said electronic circuit includes a substantial electrical conductor area, a thicker electrical conductor, one or more conductive vias, or any combination thereof, proximate to an attachment location of said electronic circuit for reducing the thermal resistance between a heat generating component thereof and the attachment location thereof.

50. The *portable* light of claim 45 wherein said heat sink maintains said light emitting diode and said electronic circuit at a temperature less than 200° C. in an ambient 40° C. environment under normal operation and under a fault condition.

51. The *portable* light of claim 45 wherein said pair of contact springs include coiled spring-like structures of electrically conductive wire extending away from said heat sink for making electrical contact with terminals of the source of electrical power.

52. The *portable* light of claim 45 wherein said heat sink of a thermally conductive material comprises: a first generally rectangular planar member for supporting said light emitting diode, and a second generally rectangular member integrally joined to the first generally rectangular member and for supporting said electronic circuit.

53. The *portable* light of claim 45 wherein said heat sink has at least two spaced apart alignment features for positioning said light emitting diode on a predetermined region of said heat sink for bonding said light emitting diode thereto.

54. The *portable* light of claim 45 wherein said electronic circuit for selectively energizing said light emitting diode receives a voltage from the source of electrical power and provides a predetermined current to said light emitting diode.

55. The *portable* light of claim 54 wherein said electronic circuit for selectively energizing said light emitting diode increases the voltage from the source of electrical power if necessary to provide the predetermined current.

56. A light comprising:

a heat sink of a thermally conductive material, said heat sink comprising a first generally rectangular planar member defining four edges and two opposing broad surfaces, two opposing elongated members each integrally joined to the first rectangular planar member proximate two opposing edges thereof, and a second generally rectangular member integrally joined at opposing ends thereof to the two elongated members and integrally joined to the first generally rectangular member;

a light emitting diode bonded by a thermally conductive adhesive to a central region of a broad surface of the first generally rectangular planar member of said heat sink between the two elongated members thereof;

wherein said heat sink has at least two spaced apart alignment features for positioning said light emitting diode on the central region of the broad surface of the first generally rectangular member of said heat sink for the bonding of said light emitting diode thereto;

a first electronic circuit board adjacent the second generally rectangular member of said heat sink comprising circuitry for energizing said light emitting diode, wherein said first electronic circuit board is supported at one end by a fastener engaging the second generally rectangular member of said heat sink;

a second electronic circuit board supporting said light emitting diode, wherein electrical contacts of said light emitting diode are electrically connected to respective conductive areas of said second electronic circuit board and to said first electronic circuit board; and a case for receiving said heat sink, said light emitting diode, said first and second electronic circuit boards, and a source of electrical power.

57. The light of claim 56 wherein an electronic component for controlling the energization of said light emitting diode is disposed on said first electronic circuit board proximate said fastener.

58. The light of claim 56 wherein said first electronic circuit board includes a substantial electrical conductor area, a thicker electrical conductor, one or more conductive vias, or any combination thereof, proximate to said fastener for reducing thermal resistance between the circuitry for energizing said light emitting diode and said fastener.

59. The light of claim 56 wherein said first electronic circuit board is attached to said heat sink without thermally conductive bonding material.

60. The light of claim 56 wherein said heat sink is fabricated from a single piece of a thermally conductive material.

61. The light of claim 60 wherein said heat sink is fabricated by machining, by casting, by die casting, by molding, or by forging the single piece of a thermally conductive material.

62. The light of claim 56 wherein the first generally rectangular planar member, the two opposing elongated members and the second generally rectangular member are fabricated separately from thermally conductive material, and wherein the first and second generally rectangular planar members and the two elongated members are integrally joined by welding, by brazing, by soldering, by a permanent adhesive, by a permanent thermally conductive adhesive, or by any combination thereof.

63. The light of claim 62 wherein each of the first generally rectangular planar member, the two opposing elongated members and the second generally rectangular member of said heat sink is fabricated by machining, by casting, by die casting, by molding, by forging, or by any combination thereof.

64. The light of claim 56 wherein said circuitry for energizing said light emitting diode receives a voltage from the source of electrical power and provides a predetermined current to said light emitting diode, and provides a voltage greater than the voltage from the source of electrical power when necessary to provide the predetermined current.

65. The light of claim 56 further comprising a pair of contact springs extending away from said heat sink for electrically connecting said first electronic circuit board to a source of electrical power.

66. The light of claim 56 further comprising a third electronic circuit board including terminals for making electrical connection to a battery, wherein said third electronic circuit board is attached to said heat sink between the two elongated members thereof juxtaposed from said first electronic circuit board and proximate an edge of the first generally rectangular member.

67. The light of claim 56 wherein said heat sink maintains said light emitting diode and the energizing circuitry of said electronic circuit board at a temperature less than 200° C. in normal operation and under a fault condition.

68. The light of claim 56 wherein said second electronic circuit board supporting said light emitting diode comprises:

said second circuit board having an opening therethrough in which said light emitting diode is disposed; or said second circuit board having a contact area thereon to which said light emitting diode is attached; or said second circuit board having a contact area thereon to which said light emitting diode is attached, wherein the contact area includes a plurality of openings, of holes, of conductive vias, of plated-through holes, of plated full plated-through holes, and/or of solder filled holes, in said second circuit board.

*69. The portable light of claim 1 further comprising:*

*a fuse connected in series with the source of electrical power and said light source; or*

*a fuse connected in series with the source of electrical power and said electronic circuit board; or*

*a fuse connected in series with the source of electrical power and with said light source and said electronic circuit board.*

*70. The portable light of claim 1 further comprising:*

*a fuse and a resistor connected in series with the source of electrical power and said light source.*

*71. The portable light of claim 1 further comprising a switch and a processor responsive to said switch for controlling the energizing of said light emitting diode.*

*72. The portable light of claim 71 wherein said switch controls energizing of said light emitting diode to operating modes including some or all of momentary ON, continuous ON, OFF, safe, dimmed, cyclical dimming, flashing, blinking, and/or timed ON.*

*73. The portable light of claim 1 wherein said light emitting diode is disposed in an opening in a circuit board for being thermally bonded directly to said heat sink.*

*74. The portable light of claim 18 wherein said light emitting diode is disposed in an opening in a circuit board for being thermally bonded directly to said heat sink.*

*75. The portable light of claim 35 wherein said light emitting diode is disposed in an opening in a circuit board for being thermally bonded directly to said heat sink.*

*76. The portable light of claim 45 further comprising:*

*a fuse connected in series with the source of electrical power and said light source; or*

*a fuse connected in series with the source of electrical power and said electronic circuit board; or*

*a fuse connected in series with the source of electrical power and with said light source and said electronic circuit board.*

*77. The portable light of claim 45 further comprising:*

*a fuse and a resistor connected in series with the source of electrical power and said light source.*

*78. The portable light of claim 45 further comprising a switch and a processor responsive to said switch for controlling the energizing of said light emitting diode.*

*79. The portable light of claim 78 wherein said switch controls energizing of said light emitting diode to operating modes including some or all of momentary ON, continuous ON, OFF, safe, dimmed, cyclical dimming, flashing, blinking, and/or timed ON.*

*80. The portable light of claim 45 wherein said light emitting diode is disposed in an opening in a circuit board for being thermally bonded directly to said heat sink.*

*81. A portable light comprising:*

*a heat sink of a thermally conductive material;*

*a light emitting diode selectively energizable for producing light, wherein said light emitting diode is thermally coupled to said heat sink;*

*an electronic circuit for selectively energizing said light emitting diode, wherein said electronic circuit has an attachment location at which it is attached to said heat sink,*

*said electronic circuit further including a switch and a processor responsive to said switch for controlling the energizing of said light emitting diode;*

*said electronic circuit further including a fuse connected in series with a source of electrical power and said light source;*

*said electronic circuit further including an electronic component that generates heat when energizing said light emitting diode and generates greater heat under a fault condition, wherein said electronic component is thermally coupled via the attachment location of said electronic circuit to said heat sink to prevent the temperature of said electronic component from increasing excessively under the fault condition; and*

*a case for receiving said heat sink, said light emitting diode, said electronic circuit, and the source of electrical power.*

*82. The portable light of claim 81 further comprising:*

*a resistor connected in series with the source of electrical power and said fuse.*

*83. The portable light of claim 81 wherein said light emitting diode is disposed in an opening in a circuit board for being thermally bonded directly to said heat sink.*

*84. A portable light comprising:*

*a heat sink of a thermally conductive material;*

*a light emitting diode selectively energizable for producing light, wherein said light emitting diode is thermally coupled to said heat sink;*

*an electronic circuit for selectively energizing said light emitting diode, wherein said electronic circuit has an attachment location at which it is attached to said heat sink,*

*said electronic circuit further including a switch and a processor responsive to said switch for controlling the energizing of said light emitting diode;*

*said electronic circuit further including a fuse connected in series with a source of electrical power and said light source;*

*said electronic circuit further including an electronic component that generates heat when energizing said light emitting diode and generates greater heat under a fault condition, wherein said electronic component is thermally coupled via the attachment location of said electronic circuit to said heat sink to prevent the temperature of said electronic component from increasing excessively under the fault condition; and*

*a case for receiving said heat sink, said light emitting diode, said electronic circuit, and the source of electrical power;*

*wherein said electronic circuit further includes:*

*a pair of contact springs extending away from said heat sink in the same direction for contacting the source of electrical power; or*

*an electronic circuit board providing the attachment location; or*

*a pair of contact springs extending away from said heat sink in the same direction for contacting the source of electrical power and an electronic circuit board providing the attachment location.*

* * * * *